US012767030B2

(12) United States Patent
Patton et al.

(10) Patent No.: US 12,767,030 B2
(45) Date of Patent: Oct. 20, 2026

(54) FULLY ADJUSTABLE REAR PASSENGER FOOT AND LEG SUPPORT

(71) Applicant: BENTLEY MOTORS LIMITED, Crewe (GB)

(72) Inventors: Mark Lee Patton, Stockport (GB); David John Paul Kelly, Nantwich (GB); Michael Roy Hudswell, Southwell (GB); Michael Richard Davis, Nantwich (GB); Huw Mcpherson, Doveridge (GB)

(73) Assignee: BENTLEY MOTORS LIMITED, Crewe (GB)

( * ) Notice: Subject to any disclaimer, the term of this patent is extended or adjusted under 35 U.S.C. 154(b) by 149 days.

(21) Appl. No.: 18/855,267

(22) PCT Filed: Apr. 5, 2023

(86) PCT No.: PCT/EP2023/059020
§ 371 (c)(1),
(2) Date: Oct. 8, 2024

(87) PCT Pub. No.: WO2023/198565
PCT Pub. Date: Oct. 19, 2023

(65) Prior Publication Data

US 2025/0249813 A1 Aug. 7, 2025

(30) Foreign Application Priority Data

Apr. 11, 2022 (GB) ...................................... 2205266

(51) Int. Cl.
*B60N 2/90* (2018.01)
*B60N 2/02* (2006.01)

(52) U.S. Cl.
CPC ......... *B60N 2/995* (2018.02); *B60N 2/02246* (2023.08)

(58) Field of Classification Search
CPC ................ B60N 2/995; B60N 2/02246; B60N 2/02253; B60N 2/02258; B60N 3/063
(Continued)

(56) References Cited

U.S. PATENT DOCUMENTS

| | | | | |
|---|---|---|---|---|
| 7,108,329 B1 * | 9/2006 | Clough | .............. | B64D 11/0643 297/423.19 |
| 8,888,189 B2 * | 11/2014 | Tamura | .................... | B60N 3/06 297/423.15 |

(Continued)

FOREIGN PATENT DOCUMENTS

| | | |
|---|---|---|
| DE | 102012223380 A1 | 6/2014 |
| KR | 20100127539 A | 12/2010 |

(Continued)

OTHER PUBLICATIONS

Combined Search Report and Examination Report Under Sections 17 & 18(3) for GB2205266.6 issued on Sep. 16, 2022, 4 pages.

(Continued)

*Primary Examiner* — Maria E Graber
(74) *Attorney, Agent, or Firm* — ISCHWABE, WILLIAMSON & WYATT, P.C.

(57) ABSTRACT

A first seat comprising a leg support for a user of a separate second seat, the leg support mounted relative to the first seat and adjustably moveable between a stowed position in which the leg support is received against a rear side of the first seat and any one of a plurality of deployed positions including at least a calf-and-foot-support position, and a foot-support position, via a continuous recliner.

19 Claims, 5 Drawing Sheets

(58) Field of Classification Search
USPC .............................................. 297/423, 423.15
See application file for complete search history.

(56) References Cited

U.S. PATENT DOCUMENTS

| | | | | |
|---|---|---|---|---|
| 9,198,516 | B2 * | 12/2015 | Yamada ............... | A47C 7/5068 |
| 11,273,736 | B2 * | 3/2022 | Salvia, III ............ | B60N 2/3045 |
| 2007/0209857 | A1 * | 9/2007 | Wolf .................. | B60N 2/02246 180/315 |
| 2015/0115684 | A1 * | 4/2015 | Weber .................... | B60N 3/063 297/423.15 |
| 2017/0197534 | A1 * | 7/2017 | An ...................... | B60N 2/02246 |

FOREIGN PATENT DOCUMENTS

| | | | | |
|---|---|---|---|---|
| KR | 1020100127539 | | * | 12/2010 |
| KR | 20110009794 | A | | 1/2011 |
| KR | 20110009797 | A | | 1/2011 |
| KR | 20210016886 | A | | 2/2021 |
| WO | 2016013786 | A1 | | 1/2016 |
| WO | WO2016013786 | | * | 1/2016 |

OTHER PUBLICATIONS

International Search Report and Written Opinion for PCT/EP2023/059020 issued on Oct. 19, 2023 from the International Searching Authority.

* cited by examiner

FULLY ADJUSTABLE REAR PASSENGER FOOT AND LEG SUPPORT

CROSS REFERENCE TO RELATED APPLICATIONS

The present application is a national phase entry under 35 U.S.C. § 371 of International Application No. PCT/EP2023/059020, filed Apr. 5, 2023, entitled "A FULLY ADJUSTABLE REAR PASSENGER FOOT AND LEG SUPPORT", which claims priority to GB Application No. 2205266.6 filed on Apr. 11, 2022, which are hereby incorporated by reference in their entireties.

TECHNICAL FIELD OF THE INVENTION

The present invention relates to foot and leg support for a passenger seated in a second seat which is located behind a first seat. In particular, but not exclusively, the invention concerns a fully adjustable rear passenger foot and leg support, for the feet or the feet and legs of a passenger in the rear of an automobile, capable of selectively supporting the feet or the feet and legs of the rear passenger.

BACKGROUND TO THE INVENTION

The 2022 Audi A8 is advertised having a footrest which deploys from the rear of a front passenger seat and acts to serve a passenger seated on the rear passenger seat. This footrest stows away in an upright manner, into a recess formed into a rear side of the front passenger seat, where a map holder or seat pocket may have been in older model vehicles. The footrest rotates downwardly from the stowed position, into a deployed position via a hinge at the bottom of the footrest (with reference to the stowed position). When deploying the footrest, the front vehicle seat also folds forward to provide further space in which to deploy the footrest.

The Audi A8 footrest provides only a stowed position and a deployed position.

When the Audi A8 front seat and footrest transition between the stowed and deployed positions, a complex sequence of simultaneous seat sliding and footrest lowering is used, in order to clear space for the legs of the intended footrest user.

The electronics and mechanical means for powering deployment and stowing the Audi A8 footrest are situated within the body of the front passenger seat, occupying space which could otherwise be utilised by other luxury accessories such as a lumbar support and/or massage system. Luxury seats could also include seat ventilation and adjustable bolsters in the body of a first seat.

The present invention aims to provide a leg support which provides adjustability during use, whilst bearing weight, which will enable a variety of positioning options to support a user's legs via their calves and/or via their feet; and/or to at least provide an improved leg rest or overcome or ameliorate one or more problems outlined above.

SUMMARY OF THE INVENTION

According to one broad aspect of the invention, there is provided a (first) seat comprising a leg support for a user of a separate (second) seat, the leg support mounted relative to the (first) seat and adjustably moveable between a stowed position in which the leg support is received against a rear side of the (first) seat and any one of a plurality of deployed positions, via a continuous recliner.

According to another broad aspect of the invention there is provided an automobile (first) seat comprising a leg support mounted relative to the rear of the (first) seat for a user of a separate (second) seat, and adjustably moveable between a stowed position in which the leg support is received against a rear side of the (first) seat and any one of a plurality of deployed positions via a continuous recliner wherein the plurality of deployed positions includes at least a calf-and-foot-support position and a foot-support position.

According to another broad aspect of the invention, there is provided a (first) seat comprising a leg support for a user of a separate (second) seat, the leg support mounted relative to the (first) seat and adjustably moveable between a stowed position in which the leg support is received against a rear side of the (first) seat, and any one of a plurality of deployed positions including at least a calf-and-foot-support position, and a foot-support position.

According to a first aspect of the invention, there is provided a (first) seat comprising a leg support for a user of a separate (second) seat, the leg support mounted relative to the (first) seat and adjustably moveable between a stowed position in which the leg support is received against a rear side of the (first) seat and any one of a plurality of deployed positions including at least a calf-and-foot-support position, and a foot-support position, via a continuous recliner.

The use of the continuous recliner to adjustably rotate the leg support results in a system in which the leg support may be conveniently stowed away and moveable into a variety of deployed positions, enabling a passenger to improve their comfort based on their comfort needs.

The first seat may be a front seat or is at least a forward seat, with another seat, the second seat, located behind the first seat.

Preferably, the leg support is fixed in any one of the deployed positions to bear weight. The continuous recliner may fix the leg support in any one of the deployed positions.

The leg support may comprise a supporting surface.

In the stowed position, the leg support is preferably aligned with a part of the (first) seat to which it is mounted. The leg support is therefore preferably oriented substantially with the (first) seat to which it is mounted.

More preferably, the leg support is preferably aligned with a rear part of the (first) seat to which it is mounted. The position of the backrest of the seat itself may be adjustable but will normally be between 45° and 180° relative to the seat cushion part.

When in the calf-and-foot-support position, the supporting surface of the leg support may be at an angle of between 30° downward from and 30° upward relative to horizontal, more preferably between 15° downward from and 15° degrees upward relative to horizontal and most preferably, approximately horizontal. When in the calf-and-foot-support position, the supporting surface may be at an angle between 60° to 120° relative to a rear surface of the automobile (first) seat, and more preferably at an angle between 75° and 105° relative to the rear surface of the automobile (first) seat.

When in the calf-and-foot-support position, the supporting surface of the leg support may be configured and positioned to directly support the lower leg(s) and foot/feet of a user with outstretched legs.

When in the foot-support position, the supporting surface of the leg support may be angled at least 30° downward from horizontal, preferably at least 40° downward from horizontal, and most preferably, at least 50° downward from horizontal.

When in the foot-support position, the supporting surface of the leg support may be configured and positioned to directly support the sole(s) of the foot/feet of a user with bent legs.

Importantly, the leg support of the present invention is configured for movement from the stowed position to any one of a plurality of deployed positions. The leg support is movable from a deployed position to a different deployed position. The leg support is movable from any deployed position to the stowed position. In any deployed position, the leg support will preferably be configured to support weight.

An angular difference of the orientation of the supporting surface of the leg support when in the calf-and-foot-support and foot-support positions may be between 30° to 100°, preferably, between 40° to 70° and most preferably, between 45° to 55°.

The orientation of the supporting surface of the leg support when in the stowed position and a deployed position may differ by at least 60° of rotation, at least 90° of rotation, preferably at least 100° of rotation, more preferably at least 120° of rotation, even more preferred, at least 130° of rotation and most preferably, approximately 140° of rotation, or more. The orientation of the supporting surface of the leg support when in the stowed position and the lower-most foot-support position (for example, the foot support position) may differ by approximately 140° of rotation. The position of the leg support may be adjustable to stop at any position within the approximately 140° of rotation.

The leg support is preferably mounted to the rear or backrest portion of the (first) seat via at least one continuous recliner. Preferably two continuous recliners are used, one continuous recliner on each side of the leg support. The use of two continuous recliners, compared to a single continuous recliner, results in greater stability of the leg support during use and less load than if a single continuous recliner were to be used.

Continuous recliner(s) are typically used in the adjustment of seat-backs and are specifically designed to maintain their angular alignment under large torque loads, such as may be experienced during a collision. As such the continuous recliner may support the weight of the passenger's legs during adjustment. The ability to bear substantial loads enables adjustment during use, while the leg support and any adjustment means are supporting the weight of the passenger's legs. This enables more comfortable adjustment as the passenger would not need to remove their legs from the leg support before adjustment may occur. Moreover, given that continuous recliners are intended to handle the loads associated with the weight of a person in a collision, they may be considered substantially over-engineered for merely supporting the weight of the legs under gravity; as such the movement will be precise, without wobbling, befitting the experience in a luxury automobile.

The leg support is preferably a movable wing. As mentioned above, the leg support is preferably mounted relative to a backrest portion of a (first) vehicle seat, preferably a front or forward seat. The leg support portion may be mounted relative to a rear side of the vehicle (first) seat.

In one embodiment, the movable wing of the leg support is received at least partially into a recess in the (first) seat, preferably a rear side of the (first) seat when in the stowed condition.

The movable wing may undergo powered movement between the stowed and at least one deployed condition, and/or the movable wing may be manually moveable.

The leg support may comprise an upper padded surface (when deployed). The supporting surface may comprise the padded surface. The addition of padding and casing provides a luxurious finish, which improves the comfort and experience of a user.

The leg support may comprise an outer casing, configured to enclose the mechanism of the leg support. The outer casing will preferably define the outer shape of the leg support and enclose a movement mechanism within the leg support. The upper padded surface may be mounted on or attached to the outer casing, preferably at an upper side (inner side when stowed). A lower and/or rearward portion of the casing may be made of a robust material to protect the leg support when in the stowed condition. The lower and/or rearward portion of the casing may also be aesthetically pleasing to camouflage the leg support against the rear of the (first) seat when in the stowed condition.

Preferably, a movement mechanism is provided within the outer casing and/or upper padded surface.

The movement mechanism may comprise a mounting plate or similar structure to mount the leg support relative to the (first) seat. The mounting plate is preferably provided adjacent to a lower side of the backrest portion of the (first) seat.

At least one mounting wing may extend from the mounting plate at an angle. The at least one mounting wing may extend perpendicularly from the mounting plate. The mounting wing may comprise a substantially planar plate. Two mounting wings may be provided, one at or toward a lateral end of the mounting plate.

The or each mounting wing may include an opening therethrough to receive an adapter to mount a hinge or continuous recliner to allow rotation of the movable wing between the stowed and at least one deployed conditions. The or each mounting wing(s) may be provided at least partially within the rear facade of the (first) seat. The or each mounting wing(s) may be provided at least partially within a recess in the rear of the (first) seat.

A continuous recliner may be mounted relative to, preferably between the mounting wings at either end of the mounting plate. A pair of continuous recliners may be provided, one at either lateral end inside each of the respective mounting wings at either end of the mounting plate.

An axle may extend between the preferred pair of continuous recliners to ensure that the continuous recliners rotate together to maintain the movable wing level. The axle may be elongate.

The movable wing is preferably mounted between the preferred pair of continuous recliners.

The movable wing may have an inner support structure. The support structure is preferably mounted relative to the mounting plate of the leg support for rotatable movement. The support structure preferably provides shape and configuration to the moveable wing. The support structure is preferably used to mount the components of the movement mechanism of the leg support and is then typically covered (protected) by the outer casing which defines the finished shape/configuration of the leg support.

The inner support structure may comprise a pair of side frame members or arrangements and at least one transverse member or arrangement extending between the side frame members or arrangements.

Each side frame member or arrangement may be generally triangular when viewed from the side, being taller at an inner end, closer to the mounting plate and smaller at an outer end, further from the mounting plate.

When viewed in plan, each side frame member or arrangement may have an inner, substantially planar end closest to the mounting plate, an outwardly extending intermediate wall extending transversely outward from an outer side of the inner, substantially planar end and an outer, substantially planar end furthest from the mounting plate. The inner, substantially planar end and the outer, substantially planar end are preferably parallel to one another. The outwardly extending intermediate wall is preferably perpendicular to both the inner, substantially planar end and the outer, substantially planar end.

The inner, substantially planar end will preferably mount to the hinge or continuous recliner.

The side frame members or arrangements or the transverse member or arrangements may be provided with one or more attachment points to attach the outer casing relative thereto. One or more attachment points may be provided on the at least one transverse member or arrangement.

At least one transverse member or arrangement may be provided between an outer end of the side frame members or arrangements.

A transverse stiffening rod or assembly may extend between the side frame members or arrangements approximately halfway between the outer end and the inner end.

A motor mount may be provided attached relative to the stiffening rod or assembly. The motor mount may include an elongate body which is mounted relative to or about the stiffening rod or assembly. The elongate body may extend laterally across the full width of the support structure. The elongate body may be substantially U-shaped in cross-section defining an opening through which the stiffening rod or assembly extends. The opening is preferably outwardly facing when stowed or downwardly facing when deployed into the calf-and-foot-support position.

A shaped motor receptacle may be provided, extending from the elongate body of the motor mount. The shaped motor receptacle is preferably located closer toward the mounting plate than the elongate body. The shaped motor receptacle may be inwardly facing in the stowed condition and upwardly facing when in the deployed the calf-and-foot-support position.

At least one motor may be carried by the movable wing of the leg support. For example, the motor may be provided within the thickness of the moveable wing, inside the preferred casing or at least partially received within the shaped motor receptacle and is preferably secured therein. A shaped motor receptacle is preferred over mounting brackets or similar for stability and to resist any torque which may be created by the motor.

The motor may be oriented transversely across the width of the movable wing, between the side frame structures or arrangements. An output shaft may be provided at one end of the motor. The motor is preferably mounted in a thicker portion of the movable wing, closer to the mounting plate.

The or each continuous recliner may comprise an inner gear plate and an outer gear plate. The inner gear plate may have a first axis of rotation. The outer gear plate may have a second axis of rotation. The second axis of rotation may be offset from the first axis of rotation. The inner and outer gear plates are preferably engaged at one point on each gear. This causes the rotation of one gear to orbit relative to the other gear.

The or each continuous recliner may be driven by a/the motor. As outlined above, the motor is preferably be mounted on/in the leg support rather than in the (first) seat. This will preserve space in the (first) seat for other components relevant to the (first) seat such as seat warmers, seat ventilation, massage devices, one or more airbags and lumbar support for example. Any type of motor may be used but preferably, an electrical motor is used. The motor may be powered by the vehicle electrics. A supply cable may extend to the motor from the (first) seat.

The motor may drive the axle extending between the or each continuous recliner, which in turn drives the or each continuous recliner (e.g. the recliners on either end). A torque transfer mechanism may be provided between the motor and the axle. The torque transfer mechanism may comprise one or more pulleys, gears and/or bands/chains, as examples to transfer the rotation of the output shaft to rotate the axle. The use of continuous recliners in conjunction with a motor may reduce the strain on the motor, and or any torque transfer mechanisms which may be utilised. Further use of two continuous recliners enables a stronger mounting to the automobile seat, as there will be two attachment points for the supporting surface and improves stability of the leg support during use.

The or each continuous recliner may also comprise a driving component. The driving component may be configured to drive rotation of the inner gear plate relative to the outer gear plate. The outer gear plate of the continuous recliner may be fixedly attached relative to the (first) seat via the mounting plate and respective mounting wing.

The continuous recliner may comprise biasing means to maintain constant engagement of the inner gear plate with the outer gear plate.

The constant engagement means that continual pressure may be applied to the gear plates comprised within the continuous recliner during use. This ensures a smooth adjustment experience with minimised hysteresis effects between driving the motor and effecting a change in the rotation of the leg support.

The inner gear plate of the continuous recliner may share the same axis of rotation as the axle. The continuous recliner may also comprise a driving component. The driving component may be configured to drive rotation of the inner gear plate relative to the outer gear plate. The axle may be configured to apply torque to the driving component which in turn drives rotation of the inner gear plate relative to the outer gear plate.

The (first) seat comprising the leg support may be a front seat. The leg support may be configured to support legs of a passenger seated in a rear (second) seat.

The (second) seat of the passenger may be referred to as a second-row seat. The (first) automobile seat comprising the leg support may be a front passenger seat. The front passenger seat may be referred to as a first-row seat. Embodiments of the present invention may however be applied to any second seat which is located behind any first seat.

The first-row seat may slide forward during operation of the leg support. The backrest portion of the first-row seat may rotate forwardly during movement of the leg support from the stowed position to any one of the deployed positions. The rotation of the backrest portion and the sliding forward of the first-row seat may occur together. The rotation of the backrest portion and the sliding forward of the first-row seat may be synchronised with the movement of the leg support from the stowed position to any one of the deployed positions. Sliding of the first-row seat may create more space for the passenger's legs by increasing the separation between the first-row seat and the rear seat.

The rear (second) seat (whose user would be using the leg support) may also be configured to recline. The seat portion of the rear (second) seat may slide forwardly. The backrest portion of the rear (second) seat may recline.

Movement of the first-row (first) seat and/or rear (second) seat may be synchronised with the movement of the leg support from the stowed position to any one of the deployed positions.

The leg support may be attached to a rear surface of the (first) automobile seat.

The first-row (first) seat and/or rear (second) seat may be provided as a part of a seating system.

The seating system may further comprise a controller to control the movement of one or more of the leg support, first-row (first) seat and the rear (second) seat. The controller may be provided in any location, such as on a portion of the first seat but will preferably be located on a portion of the rear (second) seat or the controller may be provided as a software application on a portable computing device such as a smartphone or tablet for example. The controller may be associated with the motor of the leg support. The controller may be associated with one or more motors associated with the first-row (first) seat and/or rear (second) seat. The controller will preferably control all aspects of the deployment and storage of the leg support as well as any related movement such as movement of the first-row (first) seat and/or rear (second) seat.

The controller may be configured to allow the user to define the angle or position of deployment preferred by the user before deployment begins. Such a configuration may allow the manufacturer and or the user to define one or more default or preferred deployed positions. For example, the manufacturer could define a +15° to horizontal position (calf and foot support), −15° to horizontal position (calf and foot support) and −50° to horizontal position (foot support position). Once one or more default or preferred deployed position have been set or defined, a one-press actuation switch may be operated whereupon the movable wing moves to the preferred angle or position of deployment and then stops.

The controller may include one or more switches to move the leg support in the downward (away from the stowed position) and the upward (toward the stowed position) directions. When the movable wing of the leg support has reached the desired position, the user can release the switch, stopping the movement of the movable wing.

DETAILED DESCRIPTION OF THE INVENTION

In order that the invention may be more clearly understood an embodiment/embodiments thereof will now be described, by way of example only, with reference to the accompanying drawings, of which:

Figure 4:
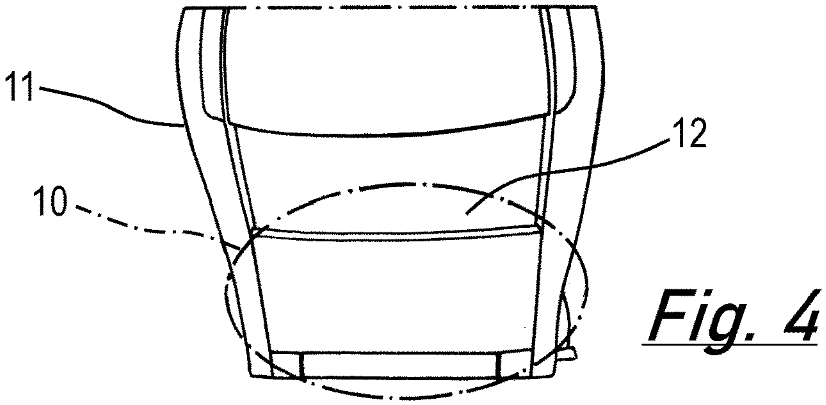
FIG. 4 shows the leg support of an embodiment in a stowed position.
Figure 5:
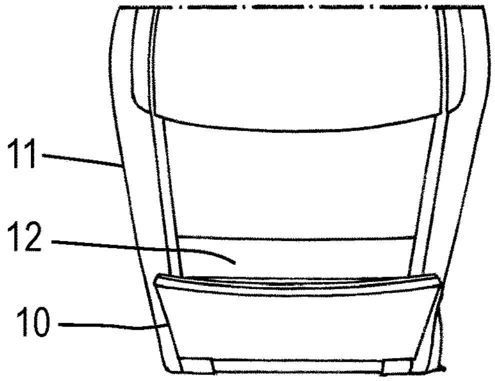
FIG. 5 shows the leg support of an embodiment in a first, partially deployed position.
Figure 6:
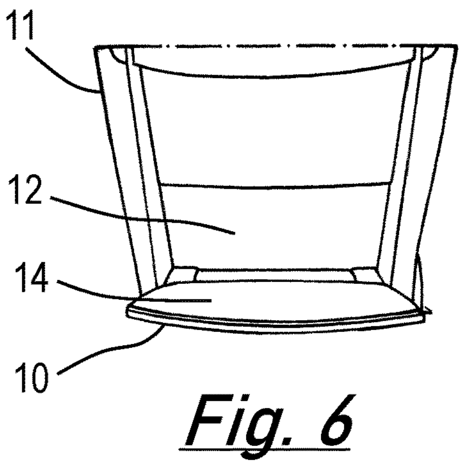
FIG. 6 shows the leg support of an embodiment in a second, partially deployed position.

According to the embodiments illustrated in the accompanying Figures, a leg support 10 for a user of a rear seat 15 is provided. As shown in FIGS. 4 to 8, the leg support 10 of the embodiment is mounted relative to the rear of the backrest portion of a front seat 11 in a vehicle and is adjustably moveable between a stowed position in which the leg support 10 is received at least partially into a recess 12 in the backrest of the front seat 11, as shown in FIG. 4, and any one of a plurality of deployed and partially deployed positions, as shown in FIGS. 5 to 8, via a continuous recliner.

Figure 7:
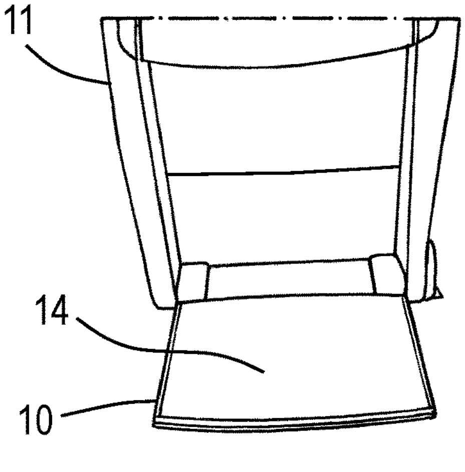
FIG. 7 shows the leg support of an embodiment in a calf-and-foot-support position deployed position.
Figure 8:
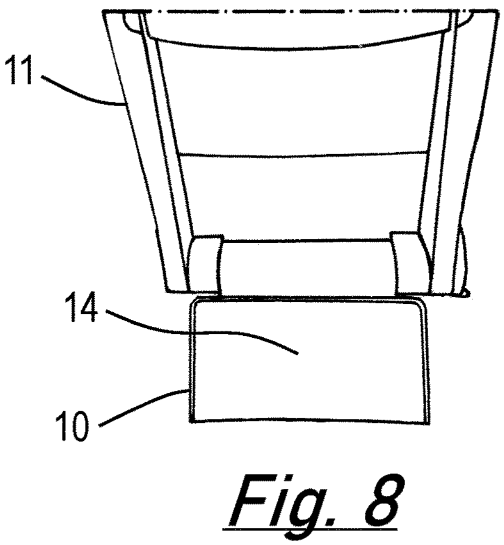
FIG. 8 shows the leg support of an embodiment in a fully deployed, foot-support position deployed position.
Figure 9:
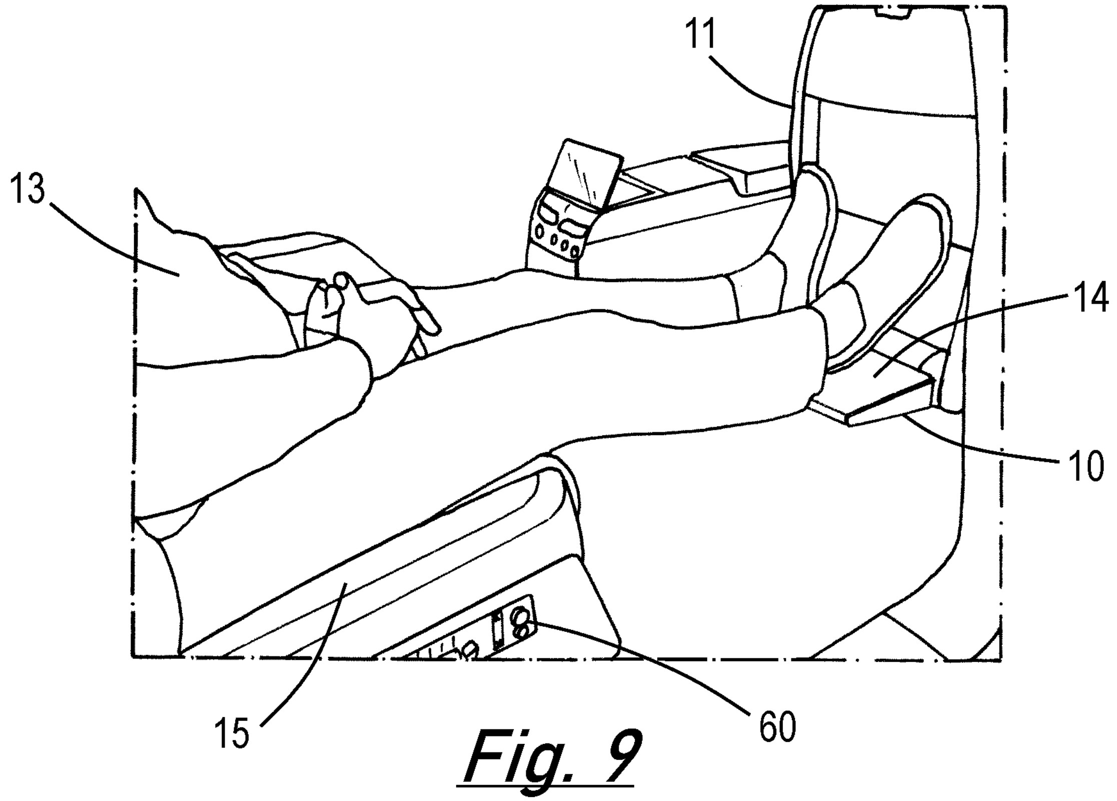
FIG. 9 shows the leg support in use, in the calf-and-foot-support position.
Figure 10:
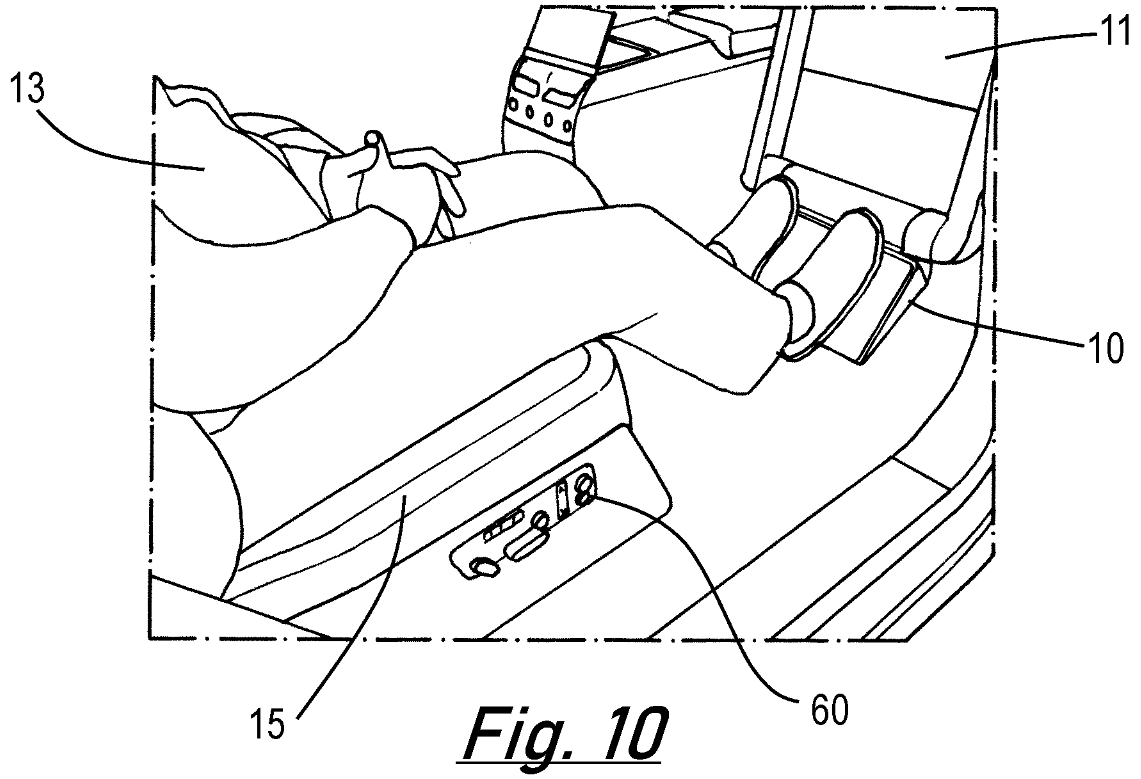
FIG. 10 shows the leg support in use in the fully deployed, foot-support position.

The deployed positions include at least a calf-and-foot-support position as illustrated in FIGS. 7 and 9 and a foot-support position as illustrated in FIGS. 8 and 10.

The use of the continuous recliner to adjustably rotate the leg support 10 results in a system in which the leg support 10 may be conveniently stowed away and yet be moveable into a variety of deployed positions, enabling a passenger 13 to improve their comfort based on their comfort needs. The continuous recliner acts to fix the leg support 10 in any one of the deployed positions to bear weight.

In the stowed position as illustrated in FIG. 4, the leg support 10 is received within a recess 12 in the rear of the front seat 11 and is aligned with the rear of the front seat 11 to which it is mounted.

The position of the backrest of the front seat 11 itself may be adjustable but will normally be between 45° and 180° relative to the seat cushion part (not shown).

When in the calf-and-foot-support position as shown in FIG. 9, the upper supporting surface 14 of the leg support 10 is approximately horizontal, regardless of the orientation of the backrest portion of the front seat 11. In this position, the upper supporting surface 14 of the leg support 11 is positioned to directly support the lower leg(s) and foot/feet of a rear passenger 13 with outstretched legs as shown in FIG. 9.

When in the foot-support position as shown in FIG. 10, the upper supporting surface 14 of the leg support 10 is angled at least 50 degrees downward from horizontal. In this position, the upper supporting surface 14 of the leg support 10 can function as a footrest against which a rear passenger 13 can place the bottom of their feet, with their knees bent, as shown in FIG. 10.

The orientation of the supporting surface 14 of the leg support 10 when in the stowed position and the lowermost foot-support positions may differ by approximately 140° of rotation. The position of the leg support 10 may be adjustable, to stop and bear weight at any position within the approximately 140° of rotation.

Figure 1:
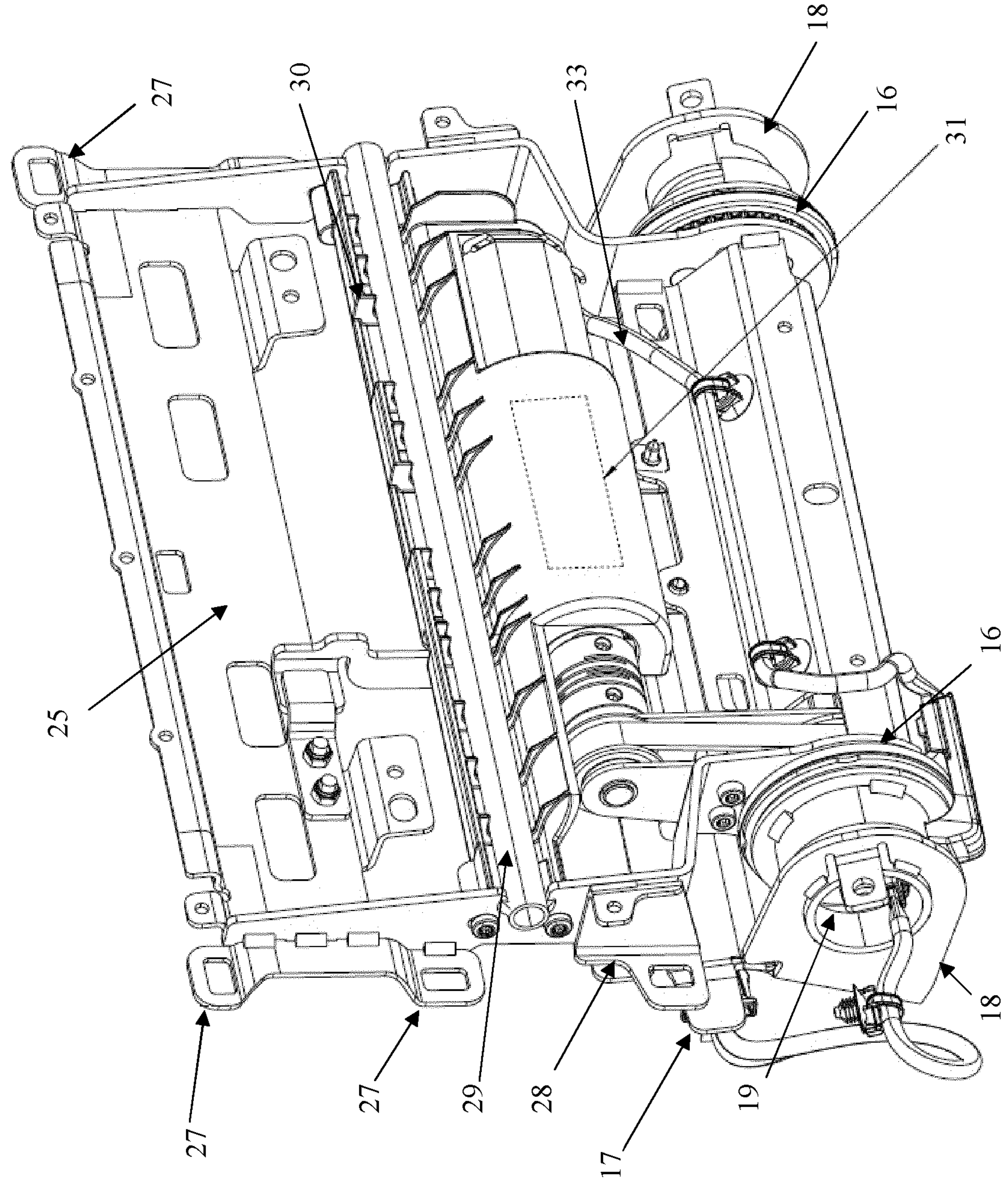
FIG. 1 shows components of the leg support in the stowed position, without any external surfacing applied.
Figure 2:
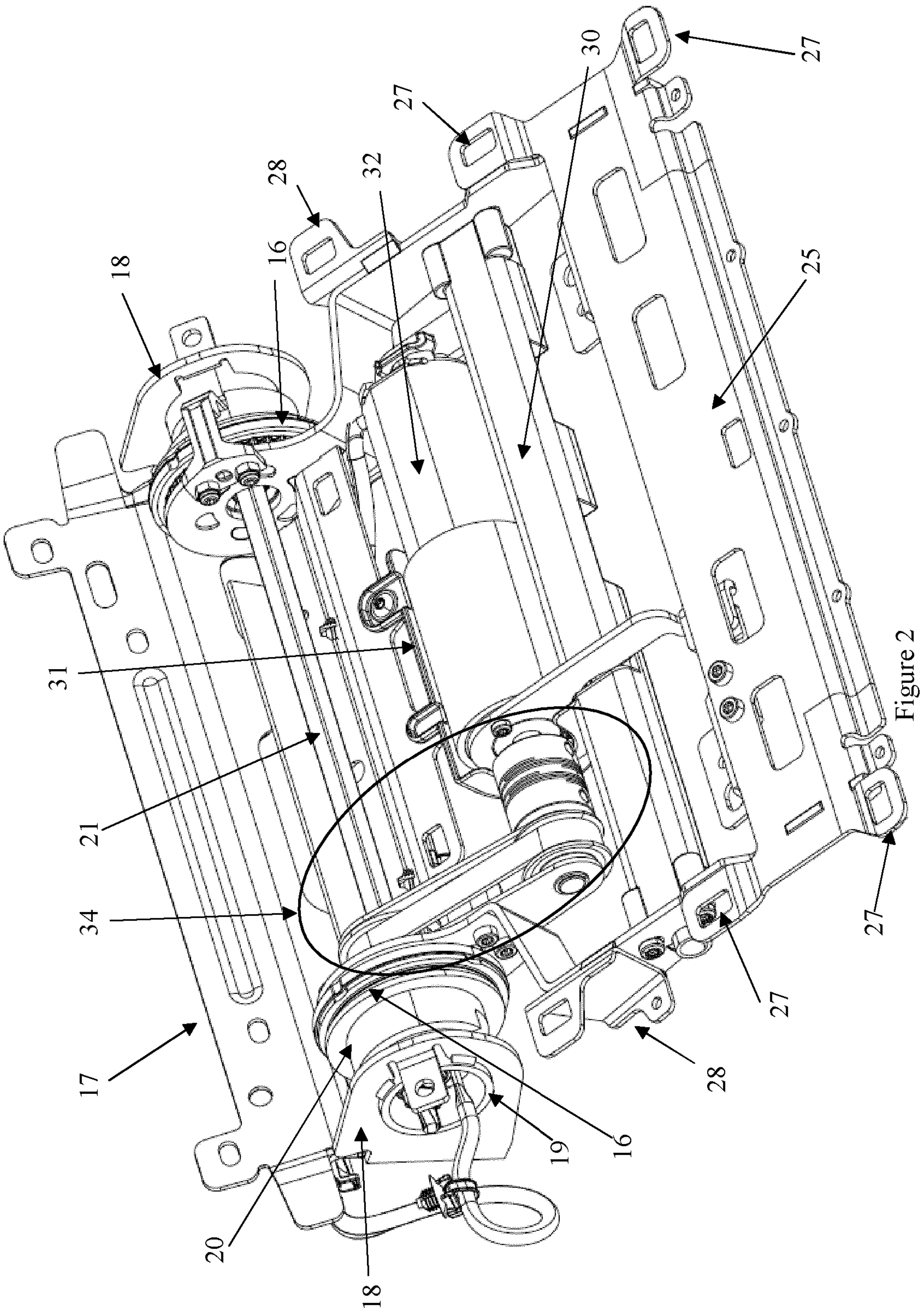
FIG. 2 shows the leg support illustrated in FIG. 1 in a deployed position, without any external surfacing applied.
Figure 3:
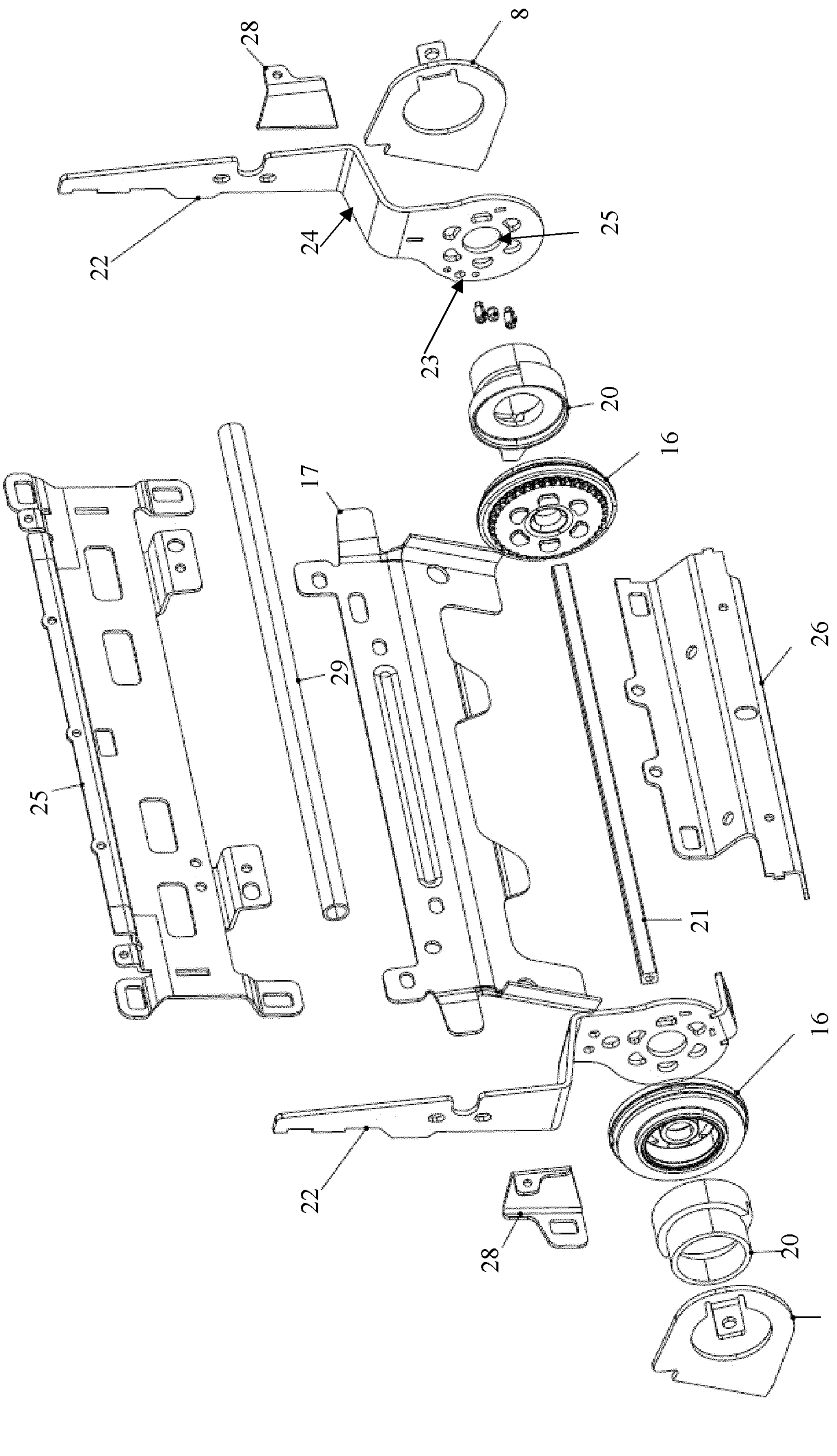
FIG. 3 shows an exploded view of a movable wing of the leg support illustrated in FIG. 1.

According to the illustrated embodiment, the leg support 10 is mounted to the rear of the backrest portion of a front seat 11 via at least one continuous recliner 16. As illustrated in FIGS. 1 to 3, two continuous recliners 16 are used, one continuous recliner 16 on each side of the leg support 10.

As shown, the leg support 10 is preferably a movable wing. The movable wing of the leg support 10 is received at least partially into a recess 12 in the front seat 11, when in the stowed condition.

The movable wing may undergo powered movement between the stowed and at least one deployed condition.

The leg support 10 may comprise an outer casing (removed in FIGS. 1 to 3 to show the inner mechanism), configured to enclose the mechanism of the leg support 10. The outer casing will preferably define the outer shape of the leg support 10. An upper padded surface is provided on an upper (inner) side of the outer casing. A lower and/or rearward portion of the casing may be made of a robust material to protect the leg support 10 when in the stowed condition which is also aesthetically pleasing to camouflage the leg support 10 against the rear of the front seat 11 when in the stowed condition as shown in FIG. 4.

An example of a movement mechanism provided within the outer casing is illustrated in FIGS. 1 to 3.

The illustrated movement mechanism comprises a mounting plate 17 to mount the leg support 10 relative to the front seat 11. The mounting plate 17 is preferably provided adjacent to a lower side of the backrest portion of the front seat 11.

Two mounting wings 18 extend from the mounting plate 17 substantially perpendicularly from the mounting plate 17. As illustrated, each mounting wing 18 is a substantially planar plate. The mounting wings are provided one at or toward each lateral end of the mounting plate 17 as best illustrated in FIG. 2.

As shown, each mounting wing 18 includes an opening 19 therethrough to receive an adapter 20 to mount a continuous recliner 16 to allow rotation of the movable wing between the stowed and at least one deployed condition. Each mounting wing(s) may be provided at least partially within the rear facade of the front seat 11, at least partially within a recess in the rear of the front seat 11.

In the illustrated embodiment, a pair of continuous recliners 16 are provided, one at either lateral end inside each of the respective mounting wings 18 at either end of the mounting plate 17.

An axle 21 extends between the pair of continuous recliners 16 to ensure that the continuous recliners 16 rotate together to maintain the movable wing level.

The movable wing of the leg support 10 is mounted between the pair of continuous recliners 16.

The movable wing has an inner support structure, an example of which is illustrated in FIG. 3. The support structure is preferably mounted relative to the mounting plate 17 of the leg support 10 for rotatable movement via the mounting wings 1 and the continuous recliners 16.

The support structure is preferably used to mount the components of the movement mechanism of the leg support 10 and is then typically covered (protected) by the outer casing (removed for clarity) which defines the finished shape/configuration of the leg support 10.

As shown in FIG. 3 in particular, the inner support structure comprises a pair of side frame members 22 and a number of transverse members extending between the side frame members 22.

Each side frame member 22 of the illustrated embodiment is generally triangular when viewed from the side, being taller at an inner end, closer to the mounting plate and smaller at an outer end, further from the mounting plate 17.

When viewed in plan, each side frame member 22 has an inner, substantially planar end closest to the mounting plate 17 which is mounted relative to the continuous recliner 16 and having an opening 25 through which the axle extends. Each side frame member 22 has an outwardly extending intermediate wall 24 extending transversely outward from an outer side of the inner, substantially planar end 23 and an outer, substantially planar end furthest from the mounting plate 17. The inner, substantially planar end 23 and the outer, substantially planar end are parallel to one another. The outwardly extending intermediate wall 24 is perpendicular to both the inner, substantially planar end 23 and the outer, substantially planar end.

In the illustrated embodiment, two transverse members are provided between the side frame members 22, an outer transverse member 25 provided between the outer ends of the side frame members 22, and an inner transverse member 26 provided between the inner ends 23 of the side frame members 22. In the illustrated embodiment, the outer transverse member 25 is provided with one or more attachment points 27 to attach the outer casing relative thereto. Another attachment point is provided on a bracket 28 mounted to an outer side of the outer, substantially planar end of the side frame member 22.

A transverse stiffening rod 29 extends between the side frame members 22 approximately halfway between the outer ends.

A motor mount may be provided attached relative to the stiffening rod 29. The motor mount may include an elongate body 30 which is mounted relative to or about the stiffening rod 22. The elongate body 30 extends laterally across the full width of the support structure. The elongate body 30 may be substantially U-shaped in cross-section defining an opening through which the stiffening rod 29 extends. The opening is outwardly facing when stowed or downwardly facing, when deployed into the calf-and-foot-support position.

A shaped motor receptacle 31 is provided, extending from the elongate body 30 of the elongate body 30 to form a unitary motor mount. The shaped motor receptacle 31 is located closer toward the mounting plate 17 than the elongate body 30. The shaped motor receptacle 31 may be inwardly facing in the stowed condition and upwardly facing when the movable wing is deployed into the calf-and-foot-support position.

A motor 32 is at least partially received within the shaped motor receptacle 31 and is secured therein.

The motor 32 is oriented transversely across the width of the movable wing, between the side frame structures 22. An output shaft (obscured) is provided at one end of the motor 32. The motor 32 is preferably mounted in a thicker portion of the movable wing, approximately centrally.

Each continuous recliner 16 comprises an inner gear plate and an outer gear plate. The inner gear plate may have a first axis of rotation. The outer gear plate may have a second axis of rotation. The second axis of rotation may be offset from the first axis of rotation. The inner and outer gear plates are preferably engaged at one point on each gear. This causes the rotation of one gear to orbit relative to the other gear.

As shown, each continuous recliner is driven by the motor 32. Any type of motor 32 may be used but preferably, an electrical motor is used. The motor 32 of the illustrated embodiment is powered by the vehicle electrics via a supply cable 33 extending to the motor 32 from the seat to which the leg support is mounted As illustrated, the motor 32 drives the axle 21 extending between the continuous recliners 16, which in turn drives the continuous recliners 16 on either end to rotate the movable wing from the stowed position to one or more deployed conditions and back to the stowed position.

A torque transfer mechanism 34 is provided between the motor and the axle 21. The torque transfer mechanism 34 illustrated includes a continuous band or chain to transfer the rotation of the output shaft to rotate the axle 21.

The use of continuous recliners 16 in conjunction with the motor 32 may reduce the strain on the motor 32, and or any torque transfer mechanisms 34 which are utilised. Further use of two continuous recliners 16 enables a stronger mounting to the automobile seat, as there will be two attachment points for the supporting surface of the movable wing and improved stability of the leg support 10 during use.

As regards the continuous recliner construction itself, the continuous recliner may also comprise a driving component, configured to drive rotation of the inner gear plate relative to the outer gear plate. As illustrated, the outer gear plate of the continuous recliner 16 is fixedly attached relative to the automobile seat via the mounting plate 17 and respective mounting wing 18 and the inner gear plate is fixedly attached relative to the movable wing of the leg support.

The continuous recliner 16 may comprise biasing means to maintain constant engagement of both the inner gear plate with the outer gear plate. The constant engagement means that continual pressure may be applied to the gear plates comprised within the continuous recliner 16 during use. This ensures a smooth adjustment experience with minimised hysteresis effects between driving the motor 32 and effecting a change in the rotation of the leg support 16.

The inner gear plate of the continuous recliner 16 may share the same axis of rotation as the axle 21. The continuous recliner 16 may also comprise a driving component. The driving component may be configured to drive rotation of the inner gear plate relative to the outer gear plate. The axle 21 may be configured to apply torque to the driving component which in turn drives rotation of the inner gear plate relative to the outer gear plate.

Suitable continuous recliners are available from Faurecia SE catalogued under part number 1823254x-01.

The seat comprising the leg support 10 may be a front seat. The leg support may be configured to support legs of a passenger seated in a rear seat as shown in FIGS. 9 and 10.

The seat of the passenger may be referred to as a second-row seat. The automobile seat comprising the leg support may be a front passenger seat. The front passenger seat may be referred to as a first-row seat. The first-row seat may slide forward during operation of the leg support. Sliding of the first-row seat may create more space for the passenger's legs.

A controller 60 may be provided in any location, such as on a portion of the front/forward seat or on a portion of a rear seat 15 or the controller 60 may be provided as a software application on a portable computing device such as a smartphone or tablet (not shown) for example. The controller 60 is associated with the motor of the leg support. The controller 60 may be associated with one or more motors associated with the front seat and/or rear seat. The controller 60 will preferably control all aspects of the deployment and storage of the leg support 10 as well as any related movement such as movement of the front seat and/or rear seat.

The controller 60 may be configured to allow the user to define the angle or position of deployment preferred by the user before deployment begins. Once the desired angle or position of deployment has been set, an actuate button or similar may be activated whereupon the movable wing of the leg support 10 moves to the selected angle or position of deployment, and then stops.

The controller 60 may include one or more switches to move the movable wing of the leg support 10 in the downward (away from the stowed position) and the upward (toward the stowed position) directions. When the movable wing of the leg support 10 has reached the desired position, the user can release the switch, stopping the movement of the movable wing.

The above embodiment is/embodiments are described by way of example only. Many variations are possible without departing from the scope of the invention as defined in the appended claims.

The invention claimed is:

1. A first seat comprising:

a. a leg support for a user of a separate second seat, the leg support mounted relative to the first seat, and b. at least one continuous recliner to adjustably move the leg support between a stowed position in which the leg support is received against a rear side of the first seat and any one of a plurality of deployed positions including at least a calf-and-foot-support position, and a foot-support position, and wherein the leg support comprises a movable wing and at least one motor carried by the movable wing to power movement between the stowed and at least one deployed condition.

2. A first seat as claimed in claim 1 wherein the leg support is aligned with a rear part of the first seat to which it is mounted.

3. A first seat as claimed in claim 1 wherein when in the calf-and-foot-support position, a supporting surface of the leg support is at an angle of between 30° downward from and 30° upward relative to horizontal.

4. A first seat as claimed in claim 1 wherein when in the calf-and-foot-support position, a supporting surface of the leg support is at an angle between 60° to 120° relative to a rear surface of the first seat.

5. A first seat as claimed in claim 1 wherein when in the foot-support position, a supporting surface of the leg support is angled at least 30° downward from horizontal.

6. A first seat as claimed in claim 1 wherein an angular difference of a supporting surface of the leg support when in the calf-and-foot-support and foot-support positions differs by between 30° to 100°.

7. A first seat as claimed in claim 1 wherein a supporting surface of the leg support, between in the stowed position and a deployed position may differ in orientation by at least 60° of rotation.

8. A first seat as claimed in claim 1 wherein the at least one continuous recliner is provided as two continuous recliners, one continuous recliner on each lateral side of the leg support.

9. A first seat as claimed in claim 1 wherein when the movable wing of the leg support is received at least partially into a recess in the first seat, preferably a rear side of the first seat when in the stowed condition.

10. An automobile including a first seat according to claim 1.

11. A first seat as claimed in claim 1 further comprising a movement mechanism to move the movable wing.

12. A first seat as claimed in claim 11 wherein the movement mechanism comprises a mounting plate or structure to mount the leg support relative to the first seat wherein the mounting plate or structure is provided adjacent to a lower side of the backrest portion of the first seat.

13. A first seat as claimed in claim 12 wherein at least one mounting wing extends from the mounting plate at an angle, each mounting wing including an opening therethrough to receive an adapter to mount the at least one continuous recliner to allow rotation of the movable wing between the stowed and at least one deployed position.

14. A first seat as claimed in any claim 1 wherein the movable wing includes a motor mount so that the at least one motor is carried by the movable wing, each at least one motor having an output shaft.

15. A first seat as claimed in claim 14 wherein the at least one continuous recliner is driven by the at least one motor.

16. A vehicle seat system comprising a first seat as claimed in claim 1 and a second seat wherein the first seat comprising the leg support is a front seat and the leg support is configured to support legs of a passenger seated in a rear second seat.

17. A vehicle seat system as claimed in claim 16 wherein the front seat slides forward during operation of the leg support.

18. A vehicle seat system as claimed in claim 17 wherein a backrest portion of the front seat rotates forwardly during movement of the leg support from the stowed position to any one of the deployed positions.

19. A vehicle seat system as claimed in claim 18 wherein the rotation of the backrest portion and the sliding forward of the front seat are synchronised with movement of the leg support from the stowed position to any one of the deployed positions.

* * * * *